Sept. 29, 1931.     R. E. WILSON     1,825,378
VALVE
Filed May 27, 1926
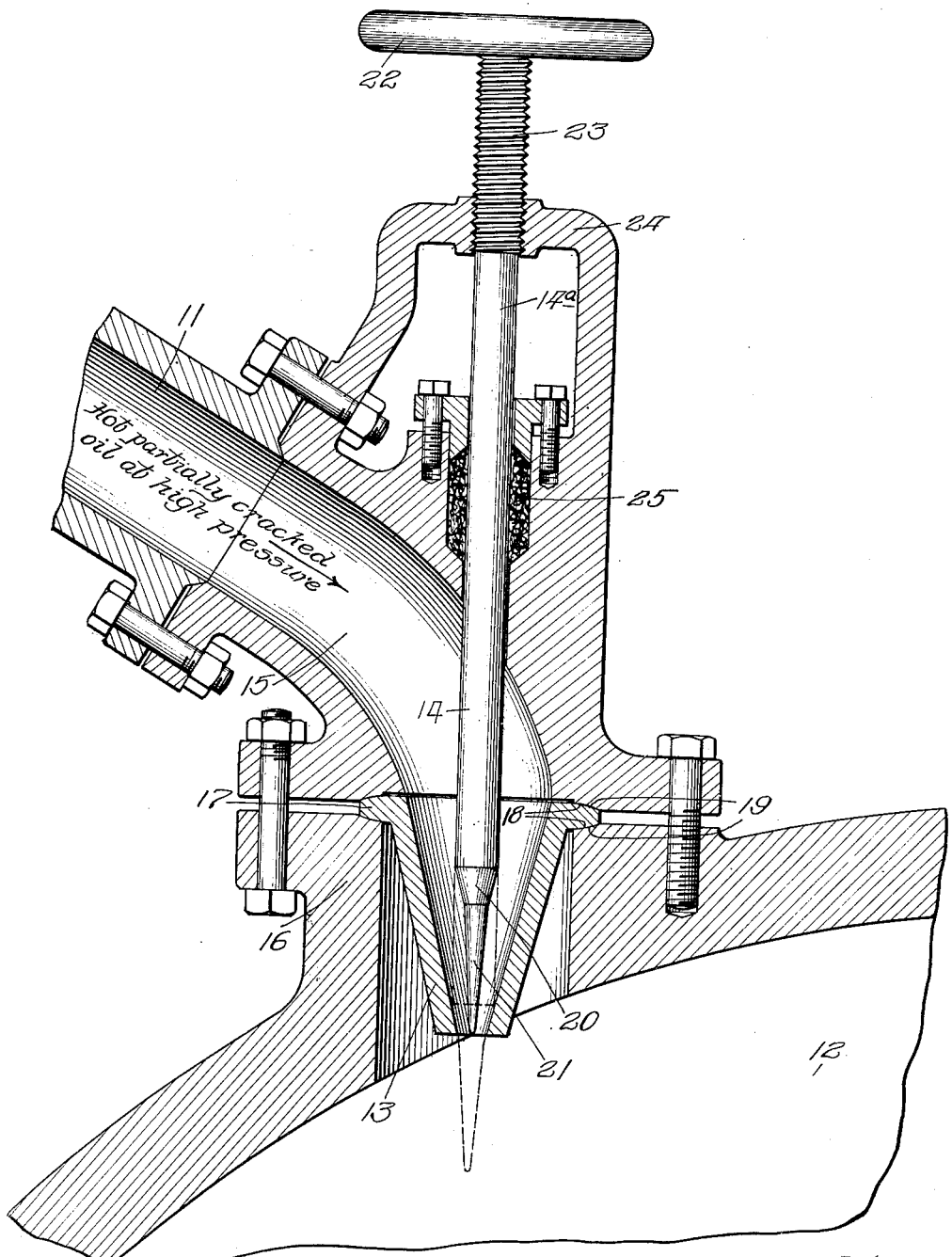

Patented Sept. 29, 1931

1,825,378

UNITED STATES PATENT OFFICE

ROBERT E. WILSON, OF CHICAGO, ILLINOIS, ASSIGNOR TO STANDARD OIL COMPANY, OF WHITING, INDIANA, A CORPORATION OF INDIANA

VALVE

Application filed May 27, 1926. Serial No. 112,024.

This invention relates to a valve for use with partially cracked petroleum liquids which have a tendency to deposit carbon. For example, when petroleum oils heated to cracking temperature or in partially cracked state, are passed through an ordinary globe or gate valve, carbon, already in free state or produced from the oil in passing through the valve, is deposited at the sharp turns or sudden restrictions in such valves, or by eddy currents on the high pressure side or on the reduced pressure conduit beyond the valve. By the present invention the flow of said oil may be controlled without such carbon deposits or obstruction thereby.

The present invention will be readily understood from the following description of a preferred form of a valve which avoids these difficulties, illustrated by the accompanying drawing in which the single figure shows an embodiment of the invention in cross section.

In the drawing the improved valve is shown in an embodiment particularly intended for controlling the flow of highly heated petroleum oil under high pressure from the pipe 11, into a still or other enlarged chamber 12, in which a lower pressure prevails. For example, the pipe 11 may contain partially cracked oil at a temperature of about 900° F., and a pressure of about 1,000 lbs. per square inch, and the pressure on the still 12 may be 400 lbs. per square inch. Under such conditions, if the passage of the oil and the drop in pressure is controlled by an ordinary type of valve, the oil tends to deposit carbon either (a) at the valve, where the oil is subjected to sharp turns or passage through sudden restrictions, or (b) ahead of the valve where it sets up eddy currents in the inlet pipe, or (c) beyond the valve, due to turbulence and to the fact that the lighter products have evaporated. The valve structure comprises a conical valve seat-part 13, a needle valve 14 and a curved conduit-part 15. The conduit-part 15 may be a steel casting and is united to the pipe 11 and the still 12 by bolts or the like, a boss 16 being provided on the still 12 for that purpose. The conical valve-part 13 is preferably provided with a flange 17 which is secured between the conduit-part 15 and the boss 16, the assembly being such that the pipe 11, conduit-part 15 and conical valve seat-part 13 constitute a conduit for the oil, devoid of sharp turns and sudden restrictions, the internal bores of the pipe 11, conduit-part 15 and the larger internal diameter of the conical valve seat-part 13 being preferably uniform, the conduit-part 15 being gradually curved and the conical-part 13 being gradually tapered.

The flange 17 of the conical valve seat-part 13 is preferably provided with convex arcuate surfaces 18 which engage with concave surfaces 19, of slightly greater curvature, on the boss 16 and conduit-part 15, so that a tight joint results when the boss 15 and conduit-part 16 are united.

The needle valve 14 is provided with a conical valve head seating surface 20, of the same pitch as the conical valve seat-part 13, a smaller more sharply tapered conical portion 21 therebeyond, and is operated, for example, by a hand wheel 22 and a screw thread 23, mounted on the valve stem 14ª, the thread 23 engaging a corresponding screw thread on a yoke 24, which is preferably integral with the conduit-part 15. The stem 14ª of the needle valve passes through the wall of the conduit-part 15, a stuffing box 25 being provided to make a tight joint. The desired amount of throttling is obtained by adjusting the hand wheel 22 until a tapered annular opening of the requisite size is constituted between the lower portion of the valve-seat 13 and the tapered part 21 of the needle valve and such throttling is secured without introducing any sudden restriction in the flow of the oil.

This valve makes possible accurate control of the flow over a wide range of openings. Owing to the stream-line path provided for the oil and the absence of sharp turns or sudden restrictions or pockets which would induce eddy currents, the tendency of the oil to deposit carbon ahead of or in the valve is minimized. Adjacent the valve-seat the potential energy of the oil under pressure is converted into kinetic energy and the high velocity of the oil passing through materially aids in keeping the valve free from deposits. Furthermore, any considerable deposit of carbon on the valve seats can generally be broken up by closing the valve and opening it whereupon the rapidly moving oil removes the crushed carbon. It is to be understood, however, that a substantial deposit of carbon can be tolerated within the valve without producing stoppage, since satisfactory flow and throttling can be attained by drawing the valve back to a certain extent. The tendency of the oil to deposit carbon after passing to a lower pressure zone is rendered innocuous by providing an enlarged chamber to receive the oil after it has passed through the valve.

The needle valve 14 and the conical valve seat-part 13 may advantageously be made from a workable metal resistant to corrosion and erosion, such as low carbon chromium iron alloys. The commercial alloy "Ascoloy" is suitable for the purpose.

While a preferred form of the invention has been described, it must be understood that it is not intended that the invention should be limited thereto, since the same is capable of many modifications within the scope of the appended claims.

I claim:

1. A valve for controlling the flow and pressure of hot, partially cracked petroleum liquids, comprising a stream line curved conduit, a gradually contracting valve-seat communicating therewith, an enlarged chamber beyond said valve seat, said valve seat being contracted in a direction toward said enlarged chamber, and a valve closure within said gradually contracting valve valve-seat and adapted to cooperate with said valve seat, the conduit, valve seat and valve closure being so constructed that at no adjustment thereof do they introduce sharp turns or sudden restrictions.

2. A valve for controlling the flow and pressure of hot, partially cracked petroleum liquids, comprising a stream line curved conduit, a conical-shaped gradually contracting valve seat-part, said valve seat-part being contracted in the direction of liquid flow therethrough, a needle valve within said contracted valve-seat for controlling the opening of said valve seat, an enlarged chamber beyond the valve seat, the curved conduit, conical valve seat-part and needle valve being so constructed that at no adjustment thereof do they introduce sharp turns or sudden restrictions within the conduit or the valve seat-part.

3. In combination, a valve for controlling the flow and pressure of hot, partially cracked petroleum liquids, comprising a gradually curved conduit, a gradually contracting conduit communicating therewith and contracted in the direction of liquid flow therethrough, a needle valve passing through the wall of said curved conduit and provided with a valve head seating surface positioned within and adapted to cooperate with said gradually contracting conduit to regulate the passage of liquid therethrough, and an enlarged chamber beyond said contracting conduit and said valve head seating surface, the passage for the liquid through the valve, in all adjustments thereof, being devoid of sharp turns and sudden restrictions and being of substantially stream line internal configuration so as to avoid eddy currents, whereby the tendency of the oil to deposit carbon and choke the valve, is substantially reduced.

4. In combination, an enlarged chamber adapted to receive hot partially cracked petroleum liquids and adapted to be maintained under substantial pressure, a stream line curved conduit adapted to receive said liquids at a higher pressure, a gradually tapering valve seat between said conduit and chamber, said valve seat being tapered in the direction of liquid flow therethrough, and a valve closure within said gradually tapering valve seat and adapted to cooperate with said valve seat, the conduit, valve seat and valve closure being so constructed that at no adjustment thereof do they introduce sharp turns or sudden restrictions.

5. A valve for controlling the flow and pressure of hot partially cracked petroleum liquids, comprising a gradually curved stream-line conduit devoid of sharp turns and sudden restrictions and provided with a terminal part opening into an enlarged chamber and adapted to supply said liquids thereto, said terminal part being tapered in the direction of flow of liquid through said conduit, and a tapered valve closure member within said tapered terminal part, the taper of said valve closure member being substantially complementary to the taper of said terminal part, whereby said conduit and valve closure member at no adjustment thereof introduce sharp turns or sudden restrictions.

6. A valve for controlling the flow and pressure of hot partially cracked petroleum liquids, comprising a gradually curved stream-line conduit devoid of sharp turns and sudden restrictions and provided with a terminal part opening into an enlarged chamber and adapted to supply said liquids thereto, said terminal part being tapered in the direction of flow of fluid through said conduit, and a tapered valve closure member within said tapered terminal part and movable in the direction of flow through said conduit for controlling the flow of oil discharged from said terminal part, the taper of said valve closure member being substantially complementary to the taper of said terminal part, whereby said conduit and valve closure member at no adjustment thereof introduce sharp turns or sudden restrictions.

7. A valve for controlling the flow and pressure of hot partially cracked petroleum liquids, comprising a gradually curved stream line conduit devoid of sharp turns and sudden restrictions and provided with a terminal part opening into an enlarged chamber and adapted to supply liquids thereto, said terminal part being tapered in the direction of flow of oil therethrough, a rod passing through the wall of said curved conduit and extending into said terminal part, said rod being provided with a reduced tapered portion adapted to be seated against the wall of said terminal part, and means for moving said rod in the direction of flow through said conduit for controlling the outlet of said terminal part without introducing sharp turns or sudden restrictions.

In testimony whereof I have hereunto set my hand this 21st day of May, 1926.

ROBERT E. WILSON.